(12) United States Patent
Avagliano et al.

(10) Patent No.: US 8,764,860 B2
(45) Date of Patent: Jul. 1, 2014

(54) SYSTEM AND METHOD FOR GASIFICATION

(75) Inventors: Aaron John Avagliano, Houston, TX (US); James Michael Storey, Houston, TX (US)

(73) Assignee: General Electric Company, Schenectady, NY (US)

( * ) Notice: Subject to any disclaimer, the term of this patent is extended or adjusted under 35 U.S.C. 154(b) by 147 days.

(21) Appl. No.: 13/589,080

(22) Filed: Aug. 17, 2012

(65) Prior Publication Data
US 2014/0048744 A1 Feb. 20, 2014

(51) Int. Cl.
*B01J 7/00* (2006.01)

(52) U.S. Cl.
USPC ............ 48/61; 48/197 R; 48/127.9; 48/127.1; 48/75; 48/76; 48/77; 48/78; 48/69; 48/67; 48/74; 48/198.3; 48/200; 48/201; 48/202; 48/203; 48/204

(58) Field of Classification Search
USPC ......... 48/197 R, 127.1, 127.9, 61, 67, 74–78, 48/69, 200, 201, 203, 204, 198.3
See application file for complete search history.

(56) References Cited

U.S. PATENT DOCUMENTS

| | | | |
|---|---|---|---|
| 6,613,111 | B2 | 9/2003 | Paisley |
| 7,749,290 | B2 | 7/2010 | Wallace |
| 7,846,226 | B2 | 12/2010 | Leininger et al. |
| 2008/0172941 | A1 | 7/2008 | Jancker et al. |
| 2010/0031570 | A1 | 2/2010 | Chen et al. |

*Primary Examiner* — Kaity V. Handal
(74) *Attorney, Agent, or Firm* — Fletcher Yoder, P.C.

(57) ABSTRACT

A system includes a gasification vessel configured to receive a fuel and an oxidizer. The system also includes a gasifier disposed in the gasification vessel. The gasifier is configured to partially oxidize the fuel and the oxidizer to generate a syngas. The system further includes a convective syngas cooler configured to cool the syngas via heat exchange with a coolant. The convective syngas cooler is disposed in an interior of the gasification vessel.

15 Claims, 4 Drawing Sheets

SYSTEM AND METHOD FOR GASIFICATION

BACKGROUND OF THE INVENTION

The subject matter disclosed herein relates to gasification systems and, more particularly, to systems for cooling syngas.

Gasifiers convert carbonaceous materials into a mixture of carbon monoxide and hydrogen, referred to as synthesis gas or syngas. For example, an integrated gasification combined cycle (IGCC) power plant includes one or more gasifiers that react a feedstock at a high temperature with oxygen and/or steam to produce syngas. The syngas may be used for power generation, chemical production, or any other suitable application. Prior to use, the syngas may be cooled in a syngas cooler and treated in a gas treatment system.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a gasification vessel configured to receive a fuel and an oxidizer. The system also includes a gasifier disposed in the gasification vessel. The gasifier is configured to partially oxidize the fuel and the oxidizer to generate a syngas. The system further includes a convective syngas cooler configured to cool the syngas via heat exchange with a coolant. The convective syngas is disposed in an interior of the gasification vessel.

In a second embodiment, a method includes partially oxidizing a fuel and an oxidizer in a gasifier to generate a syngas. The gasifier is disposed in a gasification vessel. The method also includes cooling the syngas using a convective syngas cooler disposed in an interior of the gasification vessel.

In a third embodiment, a system includes a partial oxidation vessel configured to receive a fuel and an oxidizer, a combustor disposed in the partial oxidation vessel configured to partially oxidize the fuel and the oxidizer to generate a syngas, a partial oxidation chamber disposed in the partial oxidation vessel and configured to route the syngas to a quench chamber disposed at a lower portion of the partial oxidation vessel, and a convective syngas cooler configured to cool the syngas via heat exchange with a coolant. The convective syngas cooler is disposed in an interior of the partial oxidation vessel annularly surrounding the partial oxidation chamber and above the quench chamber, and the convective syngas cooler is configured to route the syngas through an upper portion of the partial oxidation vessel.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

Figure 1:
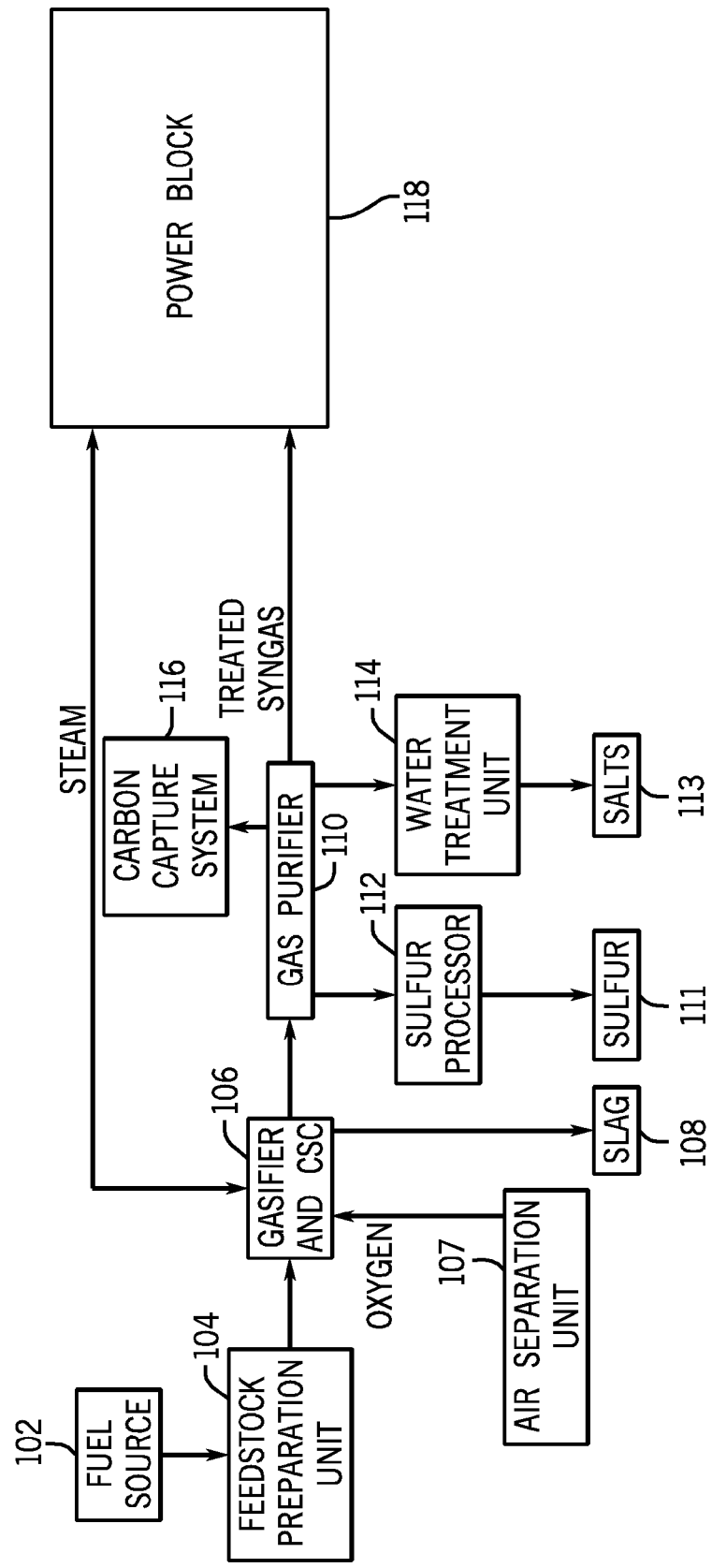
FIG. 1 illustrates a block diagram of an integrated gasification combined cycle (IGCC) power plant incorporating an integrated gasifier and convective syngas cooler (CSC) vessel according to an embodiment.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include an integrated vessel including a gasifier and a convective syngas cooler. For example, the integrated vessel may include a gasifier disposed in a gasification vessel to convert a fuel into a syngas and a convective syngas cooler in an interior of the gasification vessel that cools the syngas with a coolant. In certain embodiments, the convective syngas cooler may be in an annular configuration and may be disposed about and coaxial with a reaction chamber of the gasifier, i.e., in a concentric arrangement. Additionally, the convective syngas cooler may include an inner wall that may coincide with an outer wall of the reaction chamber, and may include an outer wall that may coincide with an inner wall of the gasification vessel.

By incorporating the convective syngas cooler in the interior of the gasification vessel, the overall construction and operability costs may be reduced. For example, the integrated vessel may reduce the quantity of construction materials (e.g., structural steel and/or concrete) used to support the vessel, because of the decrease in height and weight, as well as eliminating a transfer line, which is typically present between the gasification vessel and the convective syngas cooler. Furthermore, the integrated vessel may reduce the overall volume occupied in a plant as compared to a separate gasification vessel and convective syngas cooler. Even further, the integrated vessel may result in a shorter construction cycle.

The disclosed embodiments may also increase the cold gas efficiency as compared to a gasifier and a convective syngas cooler in separate vessels. As defined herein, cold gas efficiency is the fraction of a feedstock's chemical energy (e.g., heating value) that remains in the resulting syngas. Cold gas efficiency may be a useful measure of the efficiency of a gasification process. To increase the cold gas efficiency, the convective syngas cooler surrounding the walls of the reaction chamber may cool the reaction chamber. This reduction in temperature may enable the reaction chamber to receive a dry feedstock, thus reducing the oxidant requirements for carbon conversion. Furthermore, the reduced temperature of the reaction chamber may reduce the moderator requirements (e.g., steam, liquid water, carbon dioxide, nitrogen, and so forth) to further increase the cold gas efficiency.

FIG. 1 is a block diagram showing an embodiment of an integrated gasification combined cycle (IGCC) system 100 having an integrated vessel including a gasifier that may produce a syngas and a convective syngas cooler that may cool the syngas. Elements of the IGCC system 100 may include a fuel source 102, such as a solid feed, that may be utilized as a source of energy for the IGCC system 100. The fuel source 102 may include coal, petroleum coke, biomass, wood-based materials, agricultural wastes, tars, coke oven gas, asphalt, heavy residues from a refinery, or other carbon containing items.

The fuel of the fuel source 102 may be passed to a feedstock preparation unit 104. The feedstock preparation unit 104 may, for example, resize or reshape the fuel source 102 by chopping, milling, shredding, pulverizing, briquetting, or pelletizing the fuel source 102 to generate feedstock. Additionally, water, or other suitable liquids may be added to the fuel source 102 in the feedstock preparation unit 104 to create slurry feedstock. In other embodiments, no liquid is added to the fuel source, thus yielding dry feedstock. In further embodiments, the feedstock preparation unit 104 may be omitted if the fuel source 102 is a liquid.

The IGCC system 100 may further include an air separation unit (ASU) 107. The ASU 107 may operate to separate air into component gases by, for example, distillation techniques. The ASU 107 may separate oxygen from the air supplied to it from a supplemental air compressor, and the ASU 107 may transfer the separated oxygen to the integrated gasifier and CSC vessel 106.

The feedstock, and in certain embodiments, the oxygen from the ASU 107, may be passed to an integrated gasifier and convective syngas cooler (CSC) vessel 106 (e.g., a partial oxidation vessel) from the feedstock preparation unit 104. As will be described in more detail below, the integrated gasifier and CSC vessel 106 includes a gasifier (e.g., a reactor or a reaction chamber), which is disposed in a gasification vessel, and a CSC disposed in an interior of the gasification vessel to enable gasification and cooling of the resulting syngas in a single vessel. The integrated gasifier and CSC vessel 106 may convert the feedstock into a syngas, e.g., a combination of carbon monoxide (CO) and hydrogen. This conversion may be accomplished by subjecting the feedstock to a controlled amount of steam and an oxidizer (e.g., pure oxygen, air, or a mixture thereof) at elevated pressures, e.g., from approximately 20 bar to 85 bar, and temperatures, e.g., approximately 700 degrees Celsius (C) to 1600 degrees C., depending on the type of integrated gasifier and CSC vessel 106 utilized. The gasification process may include the feedstock undergoing a pyrolysis process, whereby the feedstock is heated. Temperatures inside a gasification chamber of the integrated gasifier and CSC vessel 106 may range from approximately 150 degrees C. to 700 degrees C. during the pyrolysis process, depending on the fuel source 102 utilized to generate the feedstock.

The volatiles generated during the pyrolysis process, also known as devolatilization, may be partially combusted by introducing an oxidant to the integrated gasifier and CSC vessel 106. The volatiles may react with the oxidant to form $CO_2$ and CO in combustion reactions, which provide heat for the subsequent gasification reactions. The temperatures generated by the combustion reactions may range from approximately 700 degrees C. to 1600 degrees C. Next, steam may be introduced into the integrated gasifier and CSC vessel 106 during a gasification step. The char may react with the $CO_2$ and steam to produce CO and hydrogen at temperatures ranging from approximately 800 degrees C. to 1100 degrees C. In essence, the integrated gasifier and CSC vessel 106 utilizes steam and oxygen to allow some of the feedstock to be "burned" to produce CO and release energy, which drives a second reaction that converts further feedstock to hydrogen and additional $CO_2$.

In this way, the integrated gasifier and CSC vessel 106 manufactures a resultant gas. This resultant gas may include approximately 85% of CO and hydrogen in equal proportions, as well as $CH_4$, HCl, HF, COS, $NH_3$, HCN, and $H_2S$ (based on the sulfur content of the feedstock). This resultant gas may be termed untreated syngas, because it includes, for example, $H_2S$. The integrated gasifier and CSC vessel 106 may also generate waste, such as slag 108, which may be a wet ash material. This slag 108 may be removed from the integrated gasifier and CSC vessel 106 and disposed of, for example, as road base or as another building material. As will be described in more detail below, the CSC of the integrated gasifier and CSC vessel 106 may be configured to facilitate the removal of slag 108 from the untreated syngas, while cooling the untreated syngas. A gas treatment unit or gas purifier 110 may be utilized to clean the untreated syngas. In one embodiment, the gas purifier 110 may include a water gas shift reactor. The gas purifier 110 may scrub the untreated syngas to remove the HCl, HF, COS, HCN, and $H_2S$ from the untreated syngas, which may include separation of sulfur 111 in a sulfur processor 112. Furthermore, the gas purifier 110 may separate salts 113 from the untreated syngas via a water treatment unit 114 that may utilize water purification techniques to generate usable salts 113 from the untreated syngas. Subsequently, the gas from the gas purifier 110 may include treated syngas (e.g., the sulfur 111 has been removed from the syngas), with trace amounts of other chemicals, e.g., $NH_3$ (ammonia) and $CH_4$ (methane).

In some embodiments, a residual gas processor may be utilized to remove additional residual gas components, such as ammonia and methane, as well as methanol or any residual chemicals from the treated syngas. However, removal of residual gas components from the treated syngas is optional, because the treated syngas may be utilized as a fuel even when it includes the residual gas components, e.g., tail gas.

The treated syngas, which has undergone the removal of its sulfur containing components and a large fraction of its carbon dioxide, may be then transmitted to a power block 118. For example, the power block 118 may include a combustor of a gas turbine engine, which may utilize the syngas as combustible fuel. The gas turbine engine may drive a load, such as an electrical generator for producing electrical power. In certain embodiments, the power block 118 may also include a heat recovery steam generator. The heat recovery steam generator may utilize steam produced by the integrated gasifier and CSC vessel 106. In certain embodiments, the heat recovery steam generator may provide steam to the integrated gasifier and CSC vessel 106, which may be utilized during the gasification process. Additionally, the heat recovery steam generator may provide steam to a steam turbine engine for power generation.

Figure 2:
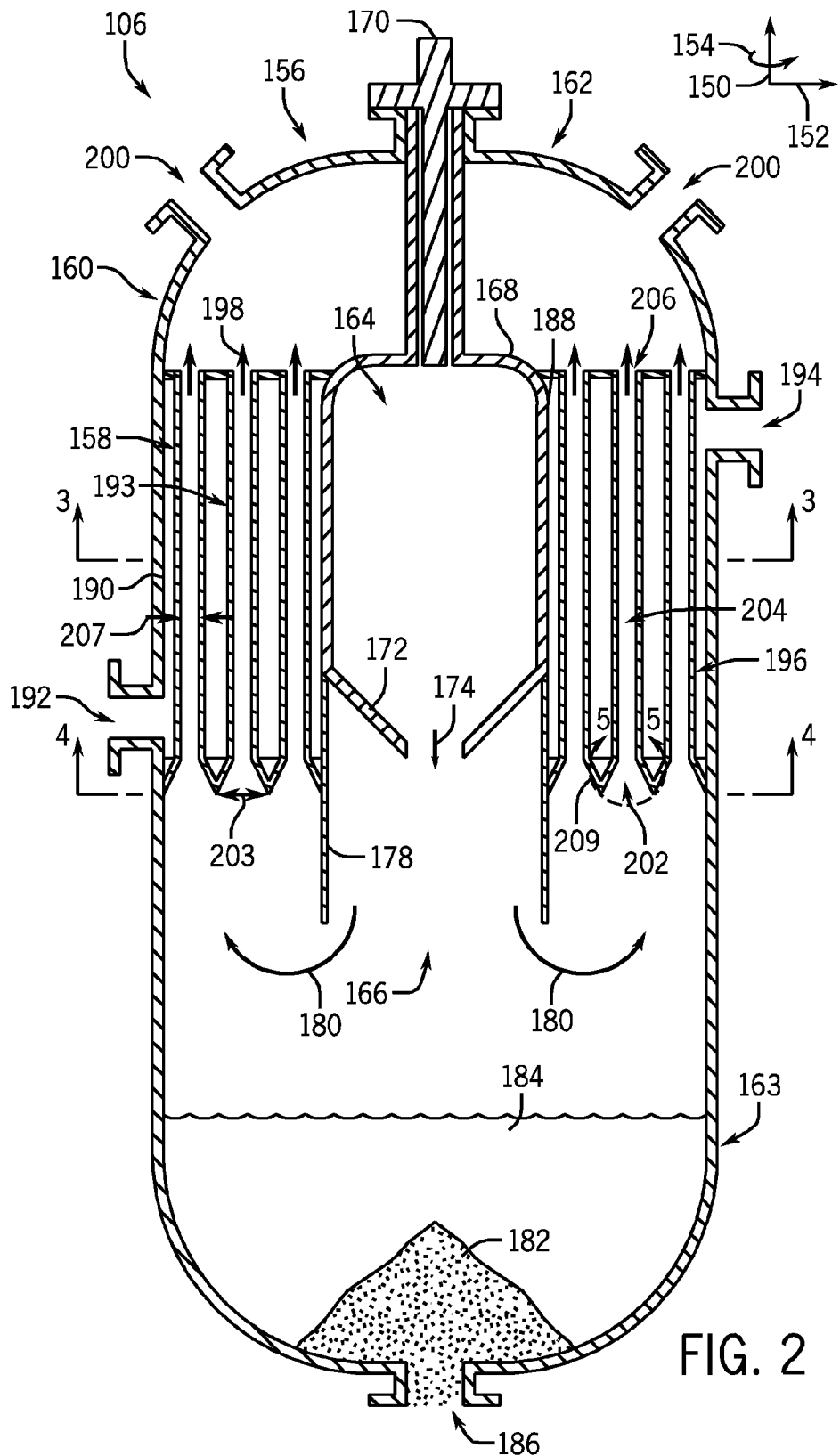
FIG. 2 is a cross-sectional side view of an embodiment of the integrated gasifier and CSC vessel of FIG. 1.

FIG. 2 is a cross-sectional side view of an embodiment of the integrated gasifier and CSC vessel 106 for use with the IGCC system 100 of FIG. 1. The integrated gasifier and CSC vessel 106 may have an axial axis or direction 150, a radial axis or direction 152 away from axis 150, and a circumferential axis or direction 154 around axis 150. As noted above, the integrated gasifier and CSC vessel 106 includes a gasification vessel 156 and a CSC 158. The integrated gasifier and CSC vessel 106 includes an enclosure 160, also referred to as the shell, that functions as a housing or outer casing for the gasification vessel 156. As will be described in more detail below, the CSC 158 is also disposed in the enclosure 160. The enclosure 160 includes a top end portion 162 and a bottom end portion 163, such that the gasification vessel 156 and the CSC 158 are in a single, integrated vessel. The gasification vessel 156 may include a gasifier and/or a combustor that is configured to partially oxidize a feedstock and an oxidizer to generate a syngas. For example, the gasification vessel 156 may include a reaction chamber 164 (e.g., a first stage of a gasifier) and a quench chamber 166 (e.g., a second stage of a gasifier). A protective barrier 168 may define the reaction chamber 164. The protective barrier 168 may act as a physical barrier, a thermal barrier, a chemical barrier, or any combination thereof. Examples of materials that may be used for the protective barrier 168 include, but are not limited to, refractory materials, refractory metals, non-metallic materials, clays, ceramics, cermets, and oxides of aluminum, silicon, magnesium, and calcium. In addition, the materials used for the protective barrier 168 may be bricks, castable, coatings, or any combination thereof. Furthermore, in certain embodiments the protective barrier 168 may include a cooling wall or a surface wetting film for additional vessel protection. The gasification vessel 156 also includes one or more inlets and/or gasification fuel injectors 170 to direct a feedstock, along with an oxidant and optional moderator, into the reaction chamber 164. Accordingly, pyrolysis, combustion, gasification, or a combination thereof, may occur as previously described with respect to FIG. 1 inside of the reaction chamber 164. In certain embodiments, the temperature in the reaction chamber 164 may be high enough to generate slagging conditions (e.g., between approximately 1250 and 1550 degrees C.). In other embodiments, the temperature may be controlled to a temperature below the softening point of ash.

The high-pressure, high-temperature untreated syngas from the reaction chamber 164 may enter the quench chamber 166 through a bottom end 172 (e.g., a gasifier throat) as illustrated by arrow 174. In certain embodiments, the untreated syngas from the reaction chamber 164 may be partially quenched in the quench chamber 166. The quench chamber 166 also functions to reduce the temperature of the syngas. In certain embodiments, the quench chamber 166 may quench the syngas to a temperature that is above the condensation temperature of entrained gas phase molecules and below the softening point of ash (e.g., between approximately 800 and 950 degrees C.). A protective barrier 178 may define the quench chamber 166. Similar to the protective barrier 168, the protective barrier 178 may act as a physical barrier, a thermal barrier, a chemical barrier, or any combination thereof, and may be constructed from refractory materials, refractory metals, non-metallic materials, clays, ceramics, cermets, bricks, castable, coatings, and oxides of aluminum, silicon, magnesium, and calcium, or any combination thereof. The protective barrier 178 may also include a cooling wall or a surface wetting film for additional vessel protection.

The protective barrier 178 may also function to direct the syngas exiting the quench chamber 166 in an upward direction, as illustrated by arrows 180. This redirection may facilitate the removal of solids 182, such as slag, particulate matter, or ash, from the syngas. The solids 182 that are separated from the upward syngas flow 180 may be collected in a sump 184, disposed at the bottom end portion 163 of the enclosure 160. In certain embodiments, the sump 184 may be filled with water or one or more chemicals to facilitate cooling of the solids 182 for easier removal through a solids outlet 186. In addition to facilitating the removal of the solids 182 from the syngas, the redirection of the syngas may align the syngas to enter the CSC 158.

As noted above, the integrated gasifier and CSC 106 includes the CSC 158. The CSC 158 is disposed in the enclosure 160 of the gasification vessel 156. In the illustrated embodiment, the CSC 158 is disposed about at least a portion of the reaction chamber 164 and the quench chamber 166. In one embodiment, the CSC 158 may only be disposed about a portion of the reaction chamber 164. As illustrated in FIG. 2, the CSC 158 is in an annular configuration and is coaxial with the reaction chamber 164 and the quench chamber 166, i.e., a concentric arrangement of the CSC 158 circumferentially around the gasification vessel 156. Furthermore, in certain embodiments, an inner wall 188 of the CSC 158 may coincide with the protective barrier 168 of the reaction chamber 164. Additionally, the CSC 158 may include an outer wall 190, which may coincide with the enclosure 160 of the gasification vessel 156. Accordingly, this integrated design of the integrated gasifier and CSC vessel 106 may reduce the construction and commissioning costs as compared to a system having a gasifier separate from the syngas cooler. For example, the integrated gasifier and CSC vessel 106 may occupy a smaller footprint in the IGCC 100, because the integrated design eliminates the additional length of the CSC 158. The integrated gasifier and CSC vessel 106 may utilize less materials (e.g., steel or concrete) and may result in a shorter construction cycle. Additionally, the integrated gasifier and CSC vessel 106 eliminates the typical heavy wall transfer line utilized to transfer the feed from a gasifier to a syngas cooler, thus reducing capital cost, as well as avoiding the traditional operating and availability problems associated with transferring the feed from unit to unit.

In certain embodiments, positioning the CSC 158 about the reaction chamber 164 and/or the quench chamber 166 may be advantageous to provide cooling to the chambers 164 and 166. For example, the CSC 158 may replace a cooling layer of the protective barrier 168 or 178. Furthermore, the reduction in temperature to the reaction chamber 164 may enable the protective barrier 168 to be constructed from less expensive refractory materials that would generally be less suitable for containing the hot syngas. As a result of incorporating the CSC 158, the gasification vessel 156, having such a refractory protective barrier 168, may receive a dry feedstock, which may cause an increase in operating temperatures, in addition to an advantageous increase in cold gas efficiency, as compared to a slurry feedstock. Furthermore, the reduction in temperature in the reaction chamber 164 may reduce the use of one or more moderators in the first stage reaction. Even further, utilizing a dry feedstock to operate at a higher temperature may reduce the overall reaction time (e.g., residence time in the reaction chamber 164), and the reaction chamber 164 may be constructed with a smaller diameter and/or length due to the reduction in reaction time. Thus, the CSC 158 that is disposed about the reaction chamber 164 and/or the quench chamber 166 may increase the overall efficiency and decrease the overall cost of the gasification vessel 156.

In general, the CSC 158 cools the syngas via heat exchange with a coolant. In certain embodiments, the CSC 158 may function as a heat exchanger, such as a shell-and-tube heat exchanger. For example, the syngas may flow through one or more tubes and a coolant may flow through the shell. Alternatively, the syngas may flow through the shell and the coolant may flow through one or more tubes. As illustrated in FIG. 2, the integrated gasifier and CSC vessel 106 may receive a coolant through an inlet 192 and may route the coolant through a shell 193 of the CSC 158 to an outlet 194. The coolant may be any suitable fluid for cooling the syngas, such as boiler feedwater or water from a steam drum. In certain embodiments, the CSC 158 may also include a plurality of tubes 196. As illustrated in FIG. 2, each tube 196 is configured to receive the syngas after it has been redirected to the upward direction 180 and to route the syngas through the CSC 158, as indicated by arrows 198, to the top end portion 162 of the integrated gasifier and CSC vessel 106, where it may exit through one or more syngas outlets 200. The tubes 196 and the syngas passing through the tubes 196 may be cooled via the coolant passing through the shell. In certain embodiments, the flow of the coolant may be cocurrent with the flow of the syngas. Alternatively, the coolant may flow countercurrent to the syngas. Additionally, as the syngas travels through the tubes 196, the heat from the syngas may cause the coolant passing through the shell to vaporize, thereby producing a steam, such as a high-pressure steam. The steam, which exits via the outlet 194, may be used as a source of heat elsewhere in the IGCC 100. For example, the steam may be used as an input to the HRSG 138, the gas purifier system 110, a polygen system, the carbon capture system 116, a methanation system, a vapor absorption system, a process heat exchanger, a reactor, an attemperator, or any combination thereof. Accordingly, the integrated gasifier and CSC vessel 106 advantageously cools the syngas and produces large quantities of high-pressure steam, which may have numerous applications for power generation.

The CSC 158 may be configured to condition the syngas, in addition to cooling the syngas. For example, the tubes 196 may be shaped to facilitate the shedding of particulates in the syngas. That is, shedding may cause particulates to separate from the syngas and, because of gravity, fall to the sump 184. In general, each tube 196 may include a tube inlet 202, having an inlet diameter 203, that is configured to receive the syngas, a cylindrical or tubular body 204 that is configured to route the syngas through the CSC 158, and a tube outlet 206, having an outlet diameter 207, that is configured to discharge the syngas to the top end portion 162 of the gasification vessel 156. In certain embodiments, each inlet diameter 203 is larger than each outlet diameter 207 to facilitate shedding of particulates. For example, the outlet diameter 207 may be between approximately 10 to 90, 20 to 80, 30 to 70, or 40 to 60 percent of the inlet diameter 203. In this manner, as the syngas flows through the tubes 196, it may contact at least portions of the inner surfaces of the tubes 196 where the diameter decreases, and the contact may cause particulates to separate from the syngas. Additionally, at least a portion of the inner surfaces of the tubes 196 may be coated with a coating 209 that is configured to resist adhesion of particulates contained in the syngas. For example, the coating 209 may be a fouling resistant coating. By way of non-limiting example, the fouling resistant coating may include boron carbide, chromium nitride, titanium nitride, titanium aluminum nitride, titanium aluminum silicon carbonitride, or any combination thereof.

Figure 3:
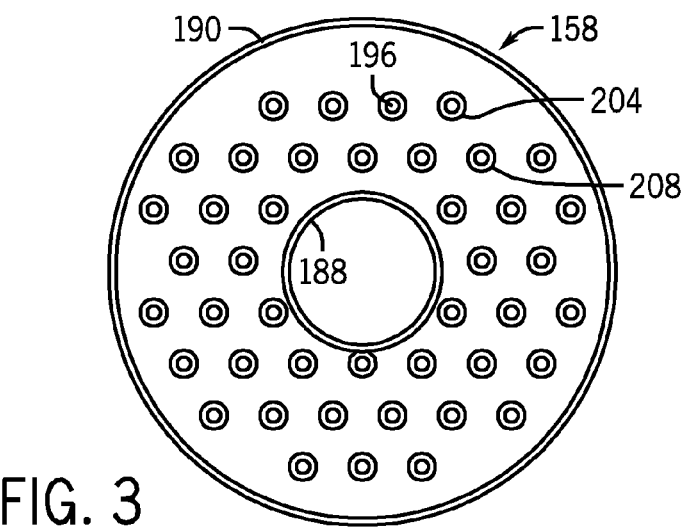
FIG. 3 is a radial cross-section of an embodiment of the integrated gasifier and CSC vessel taken along line 3-3 of FIG. 2.
Figure 4:
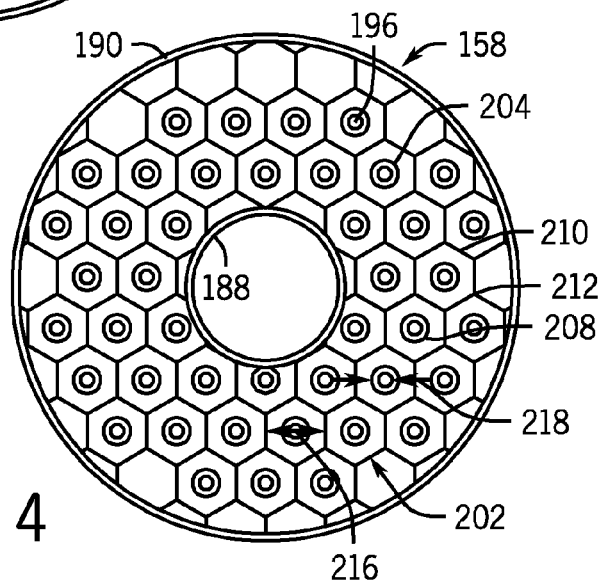
FIG. 4 is a radial cross-section of an embodiment of the integrated gasifier and CSC vessel taken along line 4-4 of FIG. 2.

In certain embodiments, the tube inlet 202 may be shaped different from the cylindrical body 204 and/or the tube outlet 206 to facilitate the shedding of particulates from the syngas. Turning to FIG. 3, which illustrates a radial cross-section taken along line 3-3 of FIG. 2, the cylindrical body 204 of each tube 196 may have a circular cross-section. In one embodiment, each tube 196 may also include a ferrule 208 (e.g., a ring or a sleeve) to strengthen each tube 196. Accordingly, each ferrule 208 may also be shaped with a circular cross-section along the cylindrical body 204. In other embodiments, the cylindrical body 204 and/or the ferrule 208 may be shaped with any suitable shape, which may be an oval, a triangle, a square, a rectangle, a polygon, and the like. Turning now to FIG. 4, which illustrates a radial cross-section taken along line 4-4 of FIG. 2, the tube inlet 202 may be hexagonal and may be configured to laterally abut neighboring tube inlets 202. The hexagonal shape that enables each tube inlet 202 to laterally abut one another may be advantageous to minimize fouling of the CSC 158 inlet. For example, the tube inlet 202 configuration may block the syngas and any particulates contained in the syngas from accumulating in between the tubes 196. Other shapes may also be suitable to laterally abut one another and minimize fouling, such as a triangle, a square, a pentagon, a heptagon, an octagon, a nonagon, and the like. Accordingly, the portion of the ferrule 208 disposed about the tube inlet 202 may be shaped to minor the tube inlet 202 (e.g., hexagonal). However, in other embodiments, the ferrule 208 may be disposed about the cylindrical body 204, and the tube 196 may include a distinct inlet ferrule 210 shaped to fit about the tube inlet 202.

Figure 5:
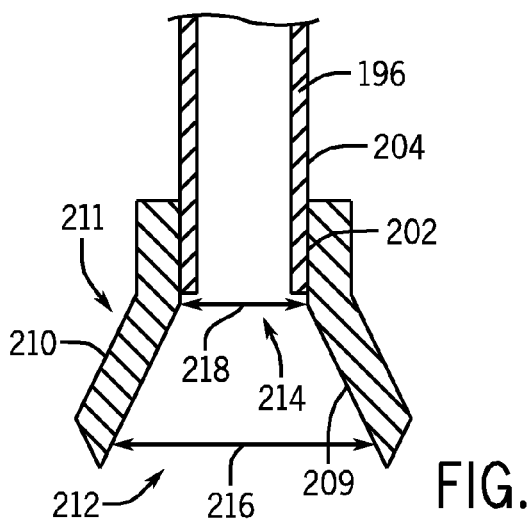
FIG. 5 is a cross-sectional side view of an embodiment of the integrated gasifier and CSC vessel taken within line 5-5 of FIG. 2.

The tube inlet 202 and/or the inlet ferrule 210 may form a conical-shaped structure. Modifying each tube 196 such that each tube inlet 202 is shaped differently than the tube outlet 206 may increase the difficulty and/or cost of manufacturing. Accordingly, in certain embodiments, it may be advantageous to provide a tube 196 without any modifications to the tube inlet 202 (e.g., the inlet diameter 203 is substantially equal to the outlet diameter 207) and to secure an inlet ferrule 210 having a conical-shaped (e.g., flared) structure to the tube 196. For example, turning briefly to FIG. 5, which illustrates a partial cross-section of taken inside line 5-5 of FIG. 2, the inlet ferrule 210 may have a conical-shaped structure 211 and may be disposed about the tube inlet 202. The inlet ferrule 210 may be secured to the tube 196 by any suitable means such as by welding. It should be appreciated that the tube inlet 202 may also be shaped to form the conical-shaped structure 211. As illustrated, the inlet ferrule 210 may have an opening 212 (e.g., the portion that first receives the syngas) and may converge to a throat 214 that couples to the tube 196 (e.g., the tube inlet 202 and/or the cylindrical body 204). More specifically, the opening 212 may have an opening diameter 216 that is greater than a throat diameter 218. In certain embodiments, the throat diameter 218 may be between approximately 10 to 90, 20 to 80, 30 to 70, or 40 to 60 percent of the opening diameter 216. Returning to FIG. 4, each opening 212 may be hexagonal or any other suitable shape such that the openings 212 may laterally abut one another, as previously described. Furthermore, it should be appreciated that as the CSC 158 may be in an annular configuration, the edges of the CSC 158 near the inner and outer walls 188 and 190 may not contain tubes 196, because there may not be sufficient space. In certain embodiments, such edges may be covered (e.g., a flat piece of metal) to block the flow of syngas.

The conical-shaped structure 211 may direct the syngas to the cylindrical body 204 in the upward direction 198 and may facilitate shedding of particulates contained in the syngas. More specifically, particulates may collide with the converging inner surfaces of the conical-shaped structure 211, which may cause the particulates to separate from the syngas and fall to the sump 184. The inlet ferrule 210 and/or the tube inlet 202 may also be coated with a coating (e.g., a fouling resistant coating, the coating 209) that is configured to resist adhesion of particulates contained in the syngas. Accordingly, the integrated gasifier and CSC vessel 106, which removes at least a portion of the particulates contained in the syngas, may reduce the amount of time and/or energy used to scrub the syngas.

Figure 6:
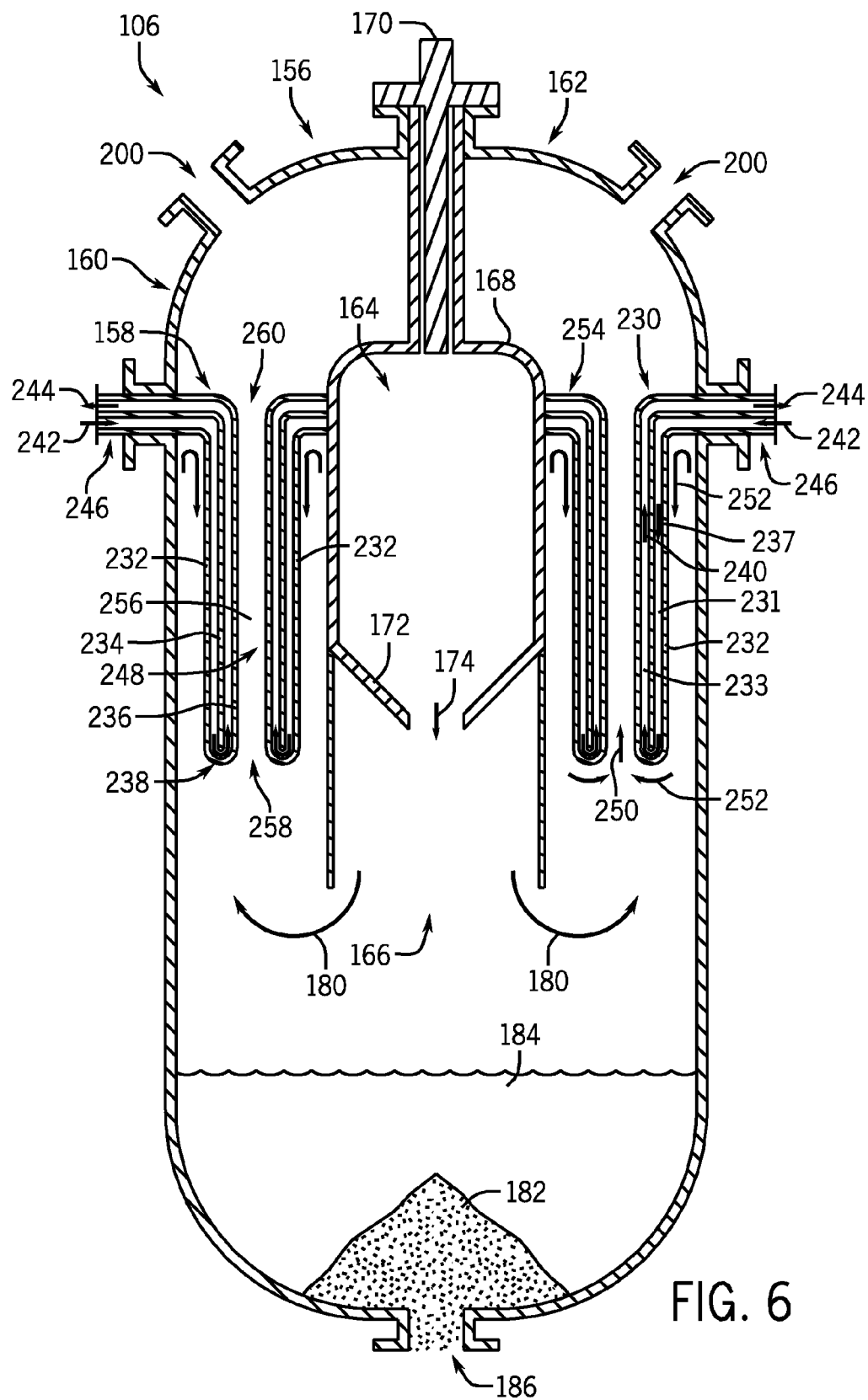
FIG. 6 is a cross-sectional side view of an embodiment of the integrated gasifier and CSC vessel of FIG. 1.

In other embodiments, the CSC 158 of the integrated gasifier and CSC vessel 106 may be configured to maximize the surface area between the syngas and the coolant to maximize heat transfer. For example, FIG. 6 illustrates a cross-section of an embodiment of the integrated gasifier and CSC vessel 106 having a plurality of tube bundles 230 (e.g., cooling jackets). Each tube bundle 230 includes a first, second, and third tubes 232, 234, and 236 disposed in a concentric arrangement to define first and second annular passageways 231 and 233. The first passageway 231 may be configured to receive and flow a coolant; the second passageway 233 may be configured to flow the coolant. In one embodiment, the coolant may be boiler feedwater that is vaporized to generate steam in the tube bundles 230. Thus, the first passageway 231 may convey the boiler feedwater and the second passageway 233 may convey the steam. The first tube 232 and the second tube 234 are fluidically coupled to one another. That is, the coolant may flow through the first passageway 231 in a downward direction, as indicated by arrow 237 and may turn at a bottom portion 238 of the tube bundle 230 to enter the second passageway 233, where the coolant and/or steam may flow in the upward direction, as indicated by arrow 240. In the illustrated embodiment, each tube bundle 230 receives the coolant at a coolant plenum and delivers the steam to a steam plenum, as indicated by arrows 242 and 244, respectively, via openings 246 in the enclosure 160. However, in other embodiments, the integrated gasifier and CSC vessel 106 may include one opening 246 and may include one or more coolant chambers and/or conduits to receive the coolant from a coolant plenum and to route the coolant to the plurality of tube bundles 230. Similarly, the integrated gasifier and CSC vessel 106 may include one or more steam chambers and/or conduits to receive steam from the plurality of tube bundles 230 and route the steam to a steam plenum.

Each tube bundle 230 may have an annular cross-section, such that the first tube 232 is on the outer side, the second tube 234 is in the middle, and the third tube 236 is on the inner side of each tube bundle 230. The plurality of tube bundles 230 may be positioned within the CSC 158 to force and/or facilitate the flow of syngas through an opening 248 of each of the plurality of tube bundles 230 in the upward direction, as indicated by arrow 250. As described herein, each opening 248 extends through the annular space of the tube bundle 230 and is configured to flow the syngas. In certain embodiments, the plurality of tube bundles 230 may be arranged such that the syngas circulates around each first tube 232, as indicated by arrows 252. For example, each tube bundle 230 may include bends or ledges 254 (e.g., a manifold for the tubes 232, 234, and 236 and the inlet 242 and outlet 244) to block syngas flowing toward the top end portion 162 of the integrated gasifier and CSC vessel 106. In this manner, the heat exchange may be improved between the syngas and the coolant.

In certain embodiments, each of the plurality of tube bundles 230 may also be configured to facilitate the shedding of particulates contained in the syngas. In particular, the diameter 256 of the opening 248 may vary along the length of each tube bundle 230. More specifically, the diameter 256 may be greater at the inlet 258 of opening 248 than at the outlet 260. For example, the diameter 256 at the outlet 260 may be between approximately 10 to 90, 20 to 80, 30 to 70, or 40 to 60 percent of the diameter 256 at the inlet 258. In this manner, the syngas may contact the inner surfaces of the tube bundle 230, which may cause the particulates to separate from the syngas and fall to the sump 184. In one embodiment, the change in diameter may be gradual along the length of the tube bundle 230. Additionally, the outer surfaces of the first tube 232 and/or the second tube 234 may be coated with a fouling resistant coating (e.g., the coating 209) that is configured to resist adhesion of any particulates contained in the syngas.

As described above, certain embodiments of the integrated gasifier and CSC vessel 106 may include the CSC 158 annularly surrounding the reaction chamber 164 of the gasification vessel 156 (i.e., in a concentric arrangement). The integrated configuration of the integrated gasifier and CSC vessel 106 may reduce the overall capital cost (e.g., construction costs and equipment footprint) as compared to a separate gasifier and CSC. Additionally, the CSC 158 may reduce the operating temperature of the reaction chamber 164. Thus, the integrated gasifier and CSC vessel 106 may be particularly suited to receive a dry feedstock and may have improved cold gas efficiency. In certain embodiments, certain features of the CSC 158 may be configured to direct the syngas through the CSC 158, to maximize heat transfer between the syngas and the coolant, and to facilitate the shedding of particulates contained in the syngas. For example, the CSC 158 may include the inlet ferrule 210 coupled to the cylindrical body 204 of each of the plurality of tubes 196. For example, the inlet ferrule may have a conical-shaped structure (e.g., a hexagonal opening that converges to a throat) that may facilitate the shedding of particulates and minimize fouling of the CSC 158.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a gasification vessel configured to receive a fuel and an oxidizer;
   a gasifier disposed in the gasification vessel and configured to partially oxidize the fuel and the oxidizer to generate a syngas; and
   a convective syngas cooler configured to cool the syngas via heat exchange with a coolant, wherein the convective syngas cooler is disposed in an interior of the gasification vessel, wherein the convective syngas cooler comprises a plurality of tubes surrounded by a shell, and wherein the convective syngas cooler is configured to flow the syngas through the plurality of tubes and the coolant through the shell.

2. The system of claim 1, wherein the gasifier comprises a reaction chamber disposed in the interior of the gasification vessel, and the reaction chamber is configured to contain the partial oxidation of the fuel and the oxidizer, and wherein the convective syngas cooler surrounds the reaction chamber in a coaxial arrangement.

3. The system of claim 1, wherein the coolant comprises a boiler feedwater.

4. The system of claim 1, wherein each of the plurality of tubes comprises:

a tubular body configured to route the syngas through the convective syngas cooler; and an inlet ferrule coupled to the tubular body and configured to route the syngas to the tubular body of each of the plurality of tubes.

5. The system of claim 4, wherein each inlet ferrule comprises a conical-shaped structure with an opening and a throat, an opening diameter is greater than a throat diameter, and the throat is coupled to the tubular body of the respective tube.

6. The system of claim 5, wherein the openings of the inlet ferrules laterally abut one another.

7. The system of claim 5, wherein the opening of the inlet ferrule comprises a pentagonal or hexagonal shape.

8. The system of claim 5, wherein an inner surface of the inlet ferrule is configured to be exposed to the syngas, and the inner surface is coated with a coating configured to resist adhesion of particles contained in the syngas.

9. The system of claim 1, wherein the convective syngas cooler is configured such that the syngas is routed through an upper portion of the gasification vessel.

10. The system of claim 1, wherein each of the plurality of tubes comprises an inlet diameter and an outlet diameter, and the inlet diameter is greater than the outlet diameter.

11. A method, comprising:

partially oxidizing a fuel and an oxidizer in a gasifier to generate a syngas, wherein the gasifier is disposed in a gasification vessel;

cooling the syngas using a convective syngas cooler disposed in an interior of the gasification vessel;

containing the partial oxidation of the fuel and the oxidizer in a reaction chamber disposed in the interior of the gasification vessel; and routing the syngas through a plurality of tubes of the convective syngas cooler annularly disposed about the reaction chamber.

12. The method of claim 11, comprising converging the syngas via a plurality of inlet ferrules coupled to the plurality of tubes, wherein the inlet ferrule comprises a conical-shaped structure with an opening and a throat, wherein an opening diameter is greater than a throat diameter.

13. The method of claim 12, wherein each of the openings of the inlet ferrules comprises a polygonal shape, and the openings are configured to laterally abut one another.

14. A system, comprising:

a partial oxidation vessel configured to receive a fuel and an oxidizer;

a combustor disposed in the partial oxidation vessel configured to partially oxidize the fuel and the oxidizer to generate a syngas;

a partial oxidation chamber disposed in the partial oxidation vessel and configured to route the syngas to a quench chamber disposed at a lower portion of the partial oxidation vessel; and a convective syngas cooler configured to cool the syngas via heat exchange with a coolant, wherein the convective syngas cooler is disposed in an interior of the partial oxidation vessel annularly surrounding the partial oxidation chamber and above the quench chamber, and the convective syngas cooler is configured to route the syngas through an upper portion of the partial oxidation vessel, and wherein the convective syngas cooler comprises a plurality of tubes configured to flow the syngas, each of the plurality of tubes comprises an inlet diameter and an outlet diameter, and the inlet diameter is greater than the outlet diameter.

15. The system of claim 14, wherein each of the plurality of tubes comprises:

a tubular body configured to route the syngas through the convective syngas cooler; and an inlet ferrule configured to route the syngas to the tubular body and comprising a conical-shaped structure with an opening and a throat, wherein an opening diameter is greater than a throat diameter, and wherein the throat is coupled to the tubular body.

* * * * *